United States Patent [19]

Mason

[11] 4,016,474
[45] Apr. 5, 1977

[54] CIRCUIT FOR CONTROLLING THE CHARGING CURRENT SUPPLIED TO A PLURALITY OF BATTERY LOADS IN ACCORDANCE WITH A PREDETERMINED PROGRAM

[75] Inventor: William B. Mason, Arlington, Tex.

[73] Assignee: ECC Corporation, Euless, Tex.

[22] Filed: Apr. 25, 1975

[21] Appl. No.: 571,535

[52] U.S. Cl. .................................. 320/15; 307/41;
                                           320/19; 320/21; 320/38
[51] Int. Cl.² ........................................ H02J 7/00
[58] Field of Search .............................. 320/14–18,
                                   320/5–8, 19, 21, 37, 38; 307/41, 38

[56] References Cited
UNITED STATES PATENTS

| | | | |
|---|---|---|---|
| 2,772,385 | 11/1956 | Dawkins et al. | 307/41 X |
| 3,504,189 | 3/1970 | McHenry | 307/41 |
| 3,723,753 | 3/1973 | Davis | 307/41 |
| 3,921,050 | 11/1975 | Rowas | 320/19 |

Primary Examiner—Robert J. Hickey
Attorney, Agent, or Firm—Giles C. Clegg, Jr.

[57] ABSTRACT

A battery charging system includes a circuit for sequentially connecting each of a plurality of banks of batteries to a constant current generator for a first predetermined period of time, for example, one hour, and then disconnecting all banks for a second predetermined period of time, for example, fifteen days. A plurality of controlled switching devices are sequentially gated to connect sequentially the banks of batteries, each for the first predetermined period of time, between the output terminals of a constant current generator. For $n$ battery loads, the controlled rectifiers are gated by $n$ outputs of a counter/decoder circuit having $n + 1$ outputs. The counter/decoder circuit is operated by clock pulse signals supplied thereto by a counter/time base circuit. The $n + 1$th output of the counter/decoder circuit re-addresses the counter/time base circuit to change the duration of the clock signal output thereof to the second predetermined time after which the clock signal is returned to the first predetermined time to clock the counter/decoder through its first to its $n + 1$th output state.

9 Claims, 2 Drawing Figures

4,016,474

CIRCUIT FOR CONTROLLING THE CHARGING CURRENT SUPPLIED TO A PLURALITY OF BATTERY LOADS IN ACCORDANCE WITH A PREDETERMINED PROGRAM

BACKGROUND OF THE INVENTION

1. Field of the Invention

The present invention relates to control circuits and, more particularly, to a circuit for controlling the charging current supplied to a plurality of battery loads in accordance with a predetermined program.

2. Technical Considerations

Sealed wet cell batteries, for example, sealed twelve-volt automobile batteries are advantageous in that they do not require periodic filling with water or other fluid since the fluid is sealed in a battery housing and cannot escape through evaporation. However, sealed wet cell batteries require some steps to be taken to insure that they remain in a fully charged condition, while they are stored for shipment or sale. Thus, sealed wet cell batteries of the type described have created the need for some means to keep the batteries fully charged and ready for use while stored.

In many industries, for example, in the communications industry, a plurality of batteries are required to be maintained in a fully charged condition. The batteries, are periodically tested and are charged by connecting a battery charging circuit to each battery. Sometimes an entire string of batteries are charged simultaneously.

Where many batteries or many strings or banks of batteries are required to be kept in a fully charged condition, it would be an advantage to have a battery charging system which operates automatically periodically to charge the batteries or banks of batteries by establishing sequentially a plurality of charging circuits in accordance with a programmed cycle.

SUMMARY OF THE INVENTION

One object of the present invention is to provide a new and improved circuit for controlling the charging current supplied to a plurality of battery loads in accordance with a predetermined program.

A further object of the present invention is to provide a new and improved battery charging system wherein a plurality of separate battery loads are connected, one at a time, to a constant current charging means in a predetermined sequence.

A further object of the present invention is to provide a new and improved battery charging system wherein a plurality of battery loads are connected one at a time to a constant current charging means in a predetermined sequence, each load being connected to the charging means for a fixed predetermined time wherein the sequence is repeated periodically after a predetermined time delay.

A circuit for controlling the charging current supplied to a plurality of battery loads in accordance with a predetermined program, in accordance with the principles of the present invention, may include first and second terminals for connecting to a current source, means for connecting the first terminal to one side of each of a plurality of battery loads, a plurality of controlled switching devices, each having first and second power electrodes and a control electrode, the first power electrode of each of the controlled switching devices for connecting to the other side of a corresponding battery load, means connecting the second power electrodes of the controlled switching devices to the second terminal, means coupled to the control electrodes of the controlled switching devices for selectively impressing a triggering potential on each controlled switching device for a first predetermined time, means for controlling the selective triggering means for triggering the controlled switching devices cyclically in a predetermined sequence, and means operable at the end of a sequencing cycle for delaying a start of a subsequent cycle for a second predetermined time.

BRIEF DESCRIPTION OF THE DRAWINGS

A complete understanding of the present invention will be obtained from the following detailed description of a preferred embodiment thereof when read in conjunction with the accompanying drawings wherein.

DETAILED DESCRIPTION

Figure 1:
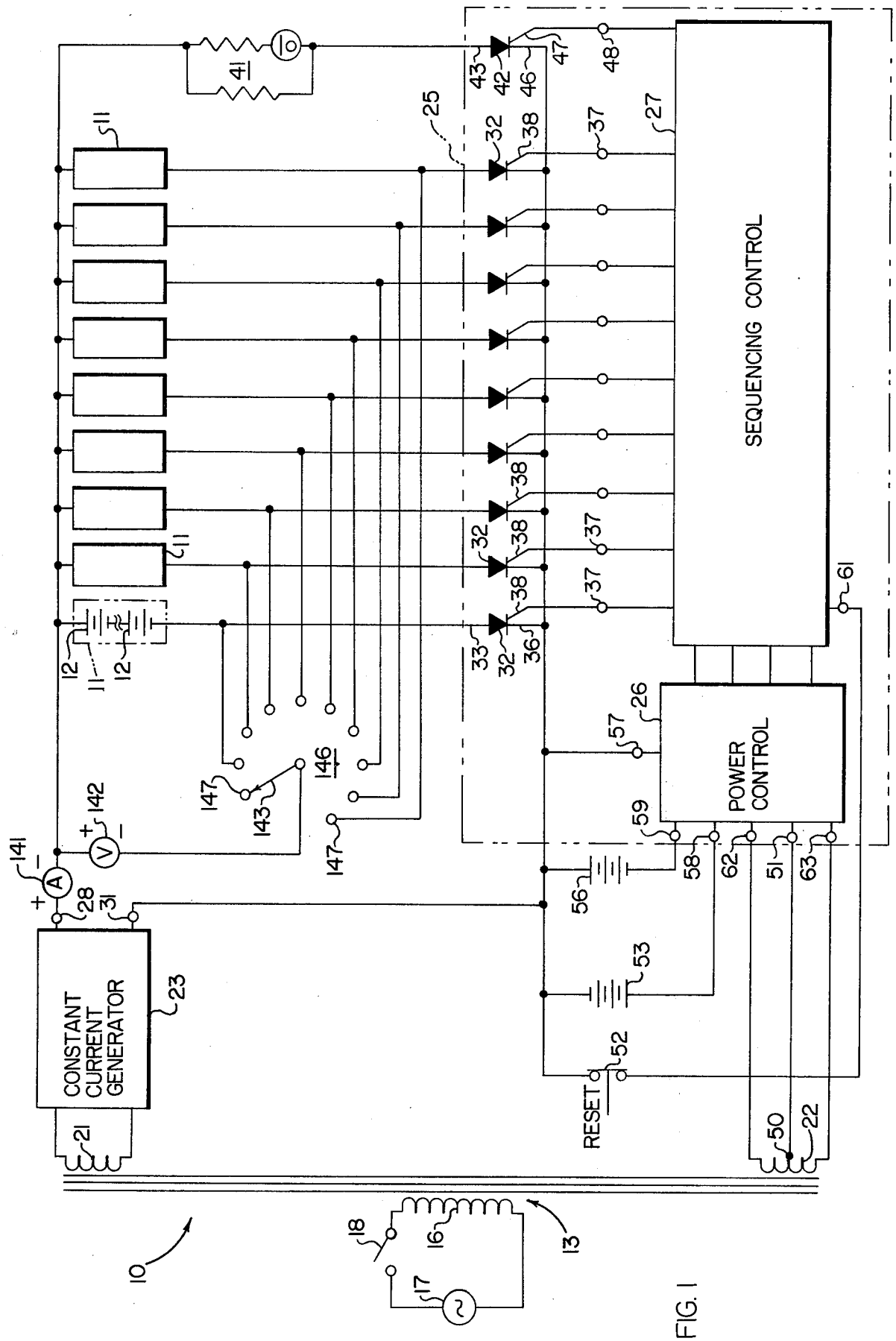
FIG. 1 shows a schematic diagram, partially in block form, illustrating a battery charging system controlled by a sequencing circuit in accordance with the principles of the present invention.

Referring to FIG. 1, there is shown a battery charging system 10 for sequentially charging a plurality of strings or banks 11-11, each containing a plurality of batteries 12-12. In its simplist form the battery charging system 10 is capable of supplying charging current sequentially to each of nine banks 11-11 for a predetermined period, for example, one hour. When the last bank 11 has been charged, the system remains in a rest or idle period having a duration of, for example, 15 days at the end of which the charging cycle repeats. The sequential charging and rest cycles repeat indefinitely to maintain each bank 11, which may contain, for example, six twelve-volt batteries connected in series, in a fully charged condition.

The charging system 10 includes a power transformer 13 having a primary winding 16 connected to a suitable 120v 60hz single phase source 17, which may be an a.c. outlet supplied through an electric utility, through a power switch 18. The transformer 13 also includes first and second secondary windings 21 and 22, respectively, for supplying power to a constant current generator 23 and a sequencing program control circuit 25 which includes a power control circuit 26 coupled to a sequencing control circuit 27 for controlling the charging program of the charging system 10.

The constant current generator 23 is provided with first and second output terminals 28 and 31, respectively, across which the nine banks 11-11 are selectively connected in parallel through a plurality of forward-biased silicon controlled rectifiers (SCRs) 32-32, each having an anode electrode 33 connected to one side of an associated bank 11 and a cathode electrode 36 connected to the output 31 of the constant current generator 23. A plurality of output terminals 37-37 of the sequencing control circuit 27 are each connected to a gate electrode 38 of corresponding one of the SCRs 32-32.

The sequencing control circuit 27 operates to produce a predetermined positive d.c. voltage level sequentially on each of the output lines 37-37 to gate each SCR 32 sequentially in order to connect each bank 11 across the output terminals 28 and 31 of the constant current generator 23 in sequence for a predetermined time according to the charging program.

The constant current generator 23 preferably produces a full wave rectified direct current output, having a constant average value, for example, four amperes. A phase angle controlled full wave rectified constant current generator suitable for use in the present system is disclosed in copending application Ser. No. 571,637, filed on even date herewith.

A neon lamp indicator circuit 41, for indicating the rest or idle condition of the charging system 10, is also selectively connected across the output terminals 28 and 31 of the constant current generator 23 through a tenth forward-biased SCR 42 having an anode electrode 43 connected to the indicator circuit 41 and a cathode electrode 46 connected to the output 31 of the constant current generator 23. A gate electrode 47 of the SCR 42 is connected to a tenth output terminal 48 of the sequencing control circuit 27. Upon initiating the rest or idle period of the charging system 10, a predetermined positive voltage level is producted on the output terminal 48 of the sequencing control circuit 27, sufficient to gate the SCR 42 to switch current through the indicator circuit 41.

The second secondary winding 22 of the power transformer 13 is provided with a center tap 50 which is connected to an input terminal 51 of the power control circuit 26. The output 31 of the constant current generator 23, is also connected to one side of a normally-closed reset switch 52, to the negative and positive terminals, respectively, of first and second supply batteries 53 and 56 and to terminal 57 of the power control circuit 26. The positive and negative terminals, respectively, of the batteries 53 and 56 are connected to a pair of terminals 58 and 59 of the power control circuit 26. The other side of the reset switch 52 is connected to an input terminal 61 of the sequencing control circuit 27. The voltage across the secondary winding 22 of the transformer 13 is coupled to the power control circuit 26 through a pair of input terminals 62 and 63.

Figure 2:
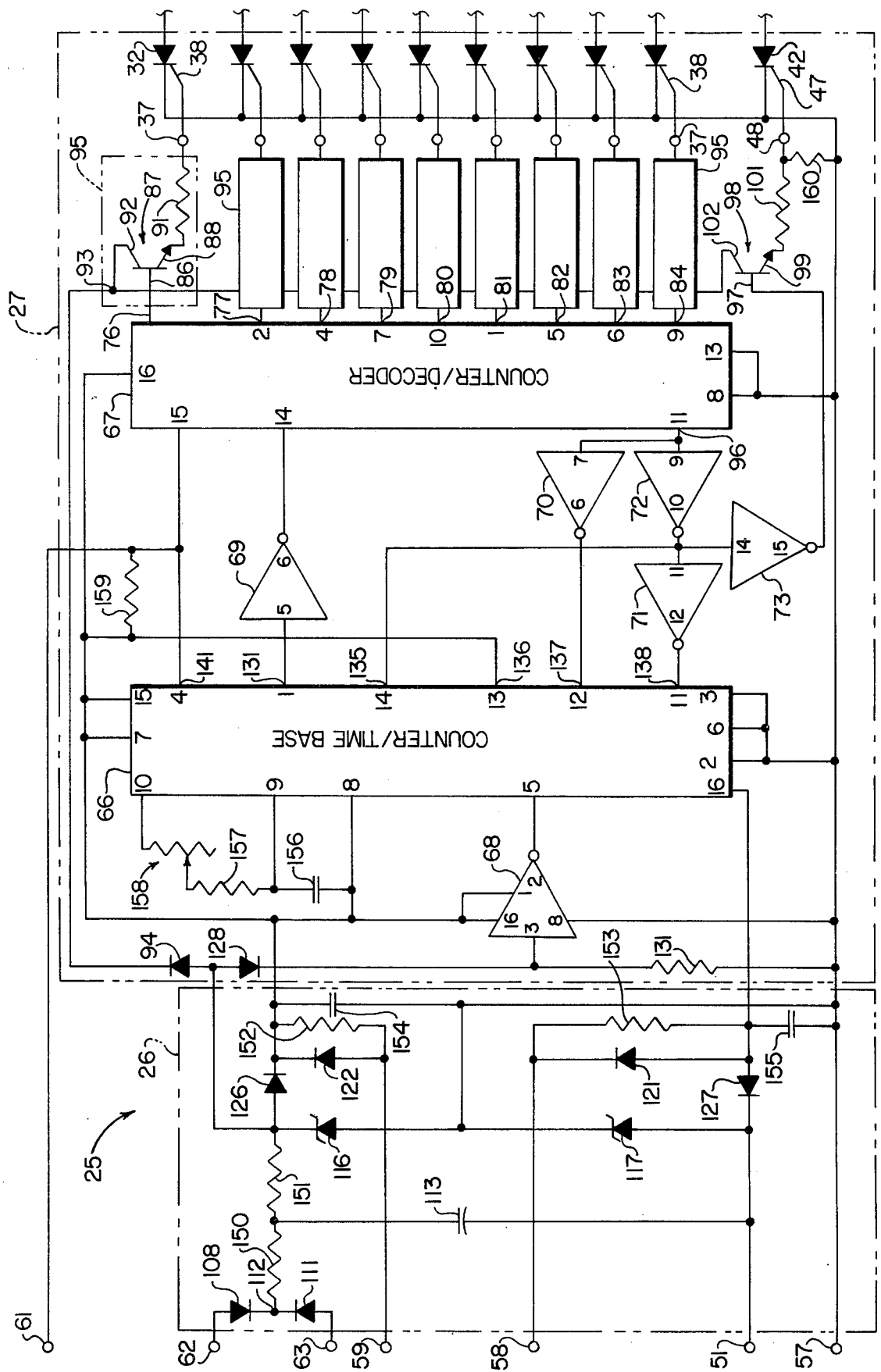
FIG. 2 is a detailed schematic diagram of a sequencing program control circuit, forming part of the battery charging system of FIG. 1.

The sequencing program control circuit 25, which comprises the power control circuit 26 and the sequencing control circuit 27, is shown in detail in FIG. 2. Before going into a detailed explanation of FIG. 2, it should be pointed out that the preferred embodiment of the sequencing control circuit 27 contains a number of metal oxide semiconductor (MOS) integrated circuit components which require some preliminary explanation.

The sequencing control circuit 27 includes a counter/time base circuit 66, which is preferably a code MK5009N integrated circuit manufactured by Mostek Company of Carrollton, Texas. A decade counter/decoder circuit 67 is preferably a code MC14017CP integrated circuit manufactured by Motorola, Inc. of Franklin Park, Illinois, or a code CD4017AE integrated circuit, manufactured by RCA Corporation of New York. Hex inverting buffers 68-73, are preferably code MC14009CP or CD4009AE integrated circuits manufactured by the above manufacturers. Each integrated circuit shown in FIG. 2 is provided with pin numbers to show the proper connections thereto. The functional diagrams and characteristics of these integrated circuits are well-known in the art and have been published by the manufacturers.

Every 15 days, the sequencing program control circuit 25 sequentially connects one of the nine banks 11-11 of batteries 12-12 to the constant current generator 23 for a period of one hour to replenish the charge on the batteries 12-12 of each bank 11. The nine load controlling SCRs 32-32 are sequentially gated by the voltage levels sequentially applied to the first nine decimal outputs 76-84 of the counter/decoder circuit 67, each of which is connected to a base 86 of an associated transistor 87 having an emitter 88 connected to the gate 38 of an associated load controlling SCR 32 through a resistor 91 and one of the terminals 37. A collector 92 of each transistor 87 is connected to a common node 93 which is connected to the cathode of a diode 94.

Each transistor 87 and its associated resistor 91 comprise a switching means 95. When one of the first nine decimal outputs 76-84 of the counter/decoder circuit attains a true or logic one level, its associated transistor 87 is biased into conduction to gate its associated SCR 32 to connect the bank 11 of batteries 12-12 connected thereto across the output terminals 28 and 31 of the constant current generator 23.

The tenth decimal output 96 of the counter/decoder circuit 67 is connected to a base 97 of a transistor 98 through hex buffers 72 and 73. An emitter 99 of the transistor 98 is connected to the gate 47 of the SCR 42 through a resistor 101 and the terminal 48. A collector 102 of the transistor 98 is connected to the common node 93.

When the tenth decimal output 96 of the counter/decoder circuit 67 attains a logic one voltage level, this level is inverted twice, once through each hex buffer 72 and 73, and is applied to the base 97 of the transistor 98 to bias the transistor 98 into conduction to gate the SCR 42 to connect the indicator circuit 41 (FIG. 1) across the outputs 28 and 31 of the constant current generator 23 to indicate the idle condition of the system 10 between the nine charging sequences.

The power control circuit 26 is of the full wave type. The terminals 62 and 63 are connected through first and second forward biased rectifier diodes 108 and 111 to a node 112, at which appears the full wave rectified power supply input voltage from the secondary winding 22 of the transformer 13 (FIG. 1) which is filtered by a capacitor 113 and regulated by Zener diodes 116 and 117.

First and second steering rectifiers 121 and 122 are provided to supply operating potential to the sequencing control circuit 27 from the supply batteries 53 and 56, respectively, connected to the terminals 58 and 59, respectively, of the power control circuit 26 in the event of an electric utility power blackout or brownout in order to maintain a status quo condition of the system memory until the power lapse is corrected. The diode 94 and two additional diodes 126 and 127 act to minimize the drain on the batteries 53 and 56 by effectively disconnecting those parts of the system circuitry which are needed to maintain the status quo of the system memory. A diode 128, a series resistor 131 and the hex buffer 68 all comprise an a.c. power detector circuit which disables a clock signal generating function of the counter/time base circuit 66 to insure that the memory of the sequencing control circuit 27 does not change during a power lapse.

The counter/time base circuit 66 operates as the system clock, generating two separate clocking signals for controlling the counter/decoder circuit 67. The first nine decimal outputs 76-84 of the counter/decoder circuit 67 are activated sequentially for one hour by a series of clock signals on an output 131 of the counter/time base circuit through the hex buffer 69 which is applied to a clock input 132 of the counter/decoder circuit 67. The duration of the clock signal on output 131 of the counter/time base circuit is changed from one hour to fifteen days by changing a binary coded decimal (BCD) address represented by BCD inputs 135-138 of the counter/time base circuit 66 as a function of the logic state of the tenth decimal output 96 of the counter/decoder circuit 67 through hex buffers 70, 71 and 72, when the tenth decimal output 96 of the counter/decoder circuit 67 assumes a true or logic one voltage level.

Referring once again to FIG. 1, the charging system 10 may be provided with a manually switched test circuit including a d.c. ammeter 141 connected to the output 28 of the constant current generator 23, a d.c. voltmeter 142 connected between the ammeter 141 and one side of a movable contactor 143 of a selector switch 146 having a plurality of contacts 147-147, each connected to the negative side of each bank 11 of batteries 12-12. The movable contactor 143 may be moved to switch the voltmeter 142 across each bank 11 to verify the voltage thereacross while the ammeter 141 verifies the current therethrough before the charging program is initiated.

The terminal 61, which is connected to reset inputs 141 and 142, respectively, of the counter/time base circuit 66 and the counter/decoder circuit 67, is used to reset the counters to zero to manually condition the system 10 for operation.

Summarizing the operation of the system 10, an operator initiates the charging sequence program by closing the power control switch 18 to supply operating potential to the system and pushing the reset switch 52. The counter/time base circuit 66 delivers a clock signal from output 131 through the hex buffer 69 to the clock input 132 of the counter/decoder circuit 67. A predetermined positive voltage level is established at the first decimal output 76 of the counter/decoder circuit 67 to gate the SCR 32 into conduction, connecting the first bank 11 of batteries 12-12 across the terminals 28 and 31 of the constant current generator 23. After one hour, clock signals at one hour intervals are delivered from the counter/time base circuit 66 to the counter/decoder circuit 67 to establish gating voltage levels sequentially on the outputs 78-84 of the counter/decoder circuit 67 sequentially to connect the remaining eight banks 11-11 across the terminals 28 and 31 of the constant current generator 23.

Immediately after the ninth bank has been charged, a subsequent clock signal from the counter/time base circuit 66 to the counter/decoder circuit 67 readdresses the BCD inputs of the counter/time base circuit 66 to produce a fifteen-day duration clock signal on the output 131 thereof. The tenth decimal output 96 of the counter/decoder circuit 67 also gates the SCR 42 into conduction to energize the indicator circuit 41 to indicate the idling period of the system 10. The entire sequencing program continues to repeat automatically until such time as the power control switch 18 is operated to stop the charging and timing of the program. The system memory remains at this point in the program until it is restarted by again operating the power control switch 18 and reset by operating the reset switch 52.

If the power from the source 17 is interrupted, the timing of the sequencing program remains at the point in the program at which the power was interrupted. Upon restoration of power, the program continues from the point in time in the program when the power interruption took place.

The remaining components shown in FIG. 2 are utilized to provide proper operating potentials for the integrated circuits therein. Each component has been supplied with a reference numeral and is listed in the following table which contains exemplary values and code designations for all of the components of the system. Other values and code numbers may vary, depending upon the application and the designer's choice.

| COMPONENT REFERENCE NUMERAL | VALUE OR CODE NUMBER |
| --- | --- |
| 66 | MK5009N |
| 67 | MC14017CP or CD4017AE |
| 68–72 | MC14009CP or CD4009AE |
| 32 | S4015L |
| 42 | S4003LS3 |
| 87,98 | MPS5172 |
| 94,108,111,121,122,126–128 | IN4002 |
| 116 | 5.6v |
| 117 | 11.2v or 2-5.6v |
| 91 | 100 ohms |
| 101 | 470 ohms |
| 131,159 | 22,000 ohms |
| 150 | 22 ohms |
| 151 | 100 ohms |
| 152,160 | 1000 ohms |
| 153,157 | 6800 ohms |
| 158 | 5000 ohms |
| 113 | 100 microfarads |
| 154,155 | 0.1 microfarads |
| 156 | 0.022 microfarads |

While the foregoing system has been described as being particularly useful in the charging of sealed 12-volt storage batteries, other uses therefore will be readily appreciated.

While the invention has been shown and described with reference to a particular preferred embodiment, other embodiments involving obvious variations will readily occur to those having ordinary skill in the art which will come within the spirit and scope of the invention.

What is claimed is:

1. In a circuit for controlling the charging current applied to a plurality of battery loads in accordance with a predetermined program including first and second terminals for connection to a current source, means for connecting one side of each of a plurality of battery loads to said first terminal and a program sequencer for selectively connecting the other side of each of said battery loads to the second terminal, the improvement wherein said program sequencer comprises:

a plurality of controlled switching devices each having first and second power electrodes and a control electrode, said first power electrode of each of said control switching devices for connecting to the other side of a corresponding battery load;
   means connecting said second power electrode of said controlled switching devices to said second terminal;
   programmable control means coupled to the control electrodes of said controlled switching devices for selectively impressing a triggering potential on each controlled switching device for a first predetermined time in a predetermined sequence and for repeating said sequence after a second predetermined time, said programmable control means including:

counter means having an input and a plurality of outputs exceeding the number of loads by unity and responsive to successive pulses at said input for consecutively actuating said outputs in a predetermined sequence;

means coupling each of said controlled electrodes of said plurality of controlled switching devices to a corresponding one of a like plurality of consecutively actuable outputs of said counter means;

clock pulse generating means coupled to the input of said counter means for consecutively actuating the outputs of said counter means and including means responsive to the remaining output of said counter means for controlling the duration of the output pulses of said clock pulse generating means; and means for connecting said programmable control means to a source of operating potential.

2. A circuit according to claim 1 wherein said programmable control means includes means responsive to the decrease of the operating potential below a predetermined level for disabling said clock pulse generating means to maintain the output sequence of said counter means at the point therein at which such decrease in operating potential occurred when a subsequent increase in operating potential above such predetermined level continues said sequence from said point.

3. A circuit according to claim 1 wherein said clock pulse generating means includes address means responsive to a control signal for establishing the duration of the output pulses of said clock pulse generating means and said means for controlling said clock pulse generating means is responsive to the actuation of the remaining output of said counter means for altering the control signal to said address means.

4. A circuit according to claim 3 wherein said address means includes four inputs responsive to a binary-coded-decimal signal and said control means for said clock pulse generating means is coupled to three of said four inputs of said address means.

5. A circuit according to claim 4 wherein said counter outputs attain a logic high voltage level when actuated and said control means for said clock pulse generating means includes first and second inverters each having an input connected to the remaining output of said counter means and an output connected to first and second inputs, respectively, of said binary-coded-decimal address means and a third inverter having an input connected to the output of said first inverter and an output connected to a third input of said binary-coded-decimal address means.

6. A circuit according to claim 5 including indicator means responsive to the actuation of said remaining output of said remaining counter means for indicating that no controlled switching devices are being triggered.

7. In a circuit for controlling the charging current to n battery loads in accordance with a predetermined program, including first and second terminals for connection to a current source, means for connecting one side of each of the battery loads to said first terminal and a program sequencer for selectively connecting the other side of each of said battery loads to the second terminal, the improvement wherein said program sequencer comprises:

n controlled switching devices, each having first and second power electrodes and a control electrode, said first power electrode of each of said controlled switching devices for connecting to the other side of a corresponding load;

means connecting said second power electrodes of said controlled switching devices to said second terminal;

counting means having an input and $n + 1$ outputs serially responsive to a series of pulses at said input;

means connecting n consecutively related ones of said serially responsive outputs of said counting means to the control electrodes of corresponding ones of said controlled switching devices for triggering said switching devices serially;

pulse generating means coupled to the input of said counting means for actuating said outputs of said counting means;

address means for establishing the pulse width of said pulse generating means; and means coupling the $n + 1$th output of said counting means to said address means for re-addressing said address means when said $n + 1$th output of said counting means is actuated to change the established pulse width output of said pulse generating means.

8. A circuit according to claim 7 including indicator means connected to said first terminal;

an $n + 1$th controlled switching device having first and second power electrodes connected to said indicator means and said second terminal, respectively, and a control electrode; and means coupling said $n + 1$th output of said counting means to said control electrode of said $n + 1$th controlled switching device for triggering said controlled switching device when said $n + 1$th counter output is actuated.

9. A circuit according to claim 8 wherein said means coupling said outputs of said counting means to said control electrodes of said controlled switching devices includes switching means responsive to a predetermined voltage level for establishing a triggering potential on said control electrodes.

* * * * *